United States Patent [19]
Wallays

[11] Patent Number: 5,758,802
[45] Date of Patent: Jun. 2, 1998

[54] ICING SET

[75] Inventor: Nele Wallays, Antwerp, Belgium

[73] Assignee: Dart Industries Inc., Orlando, Fla.

[21] Appl. No.: 709,353

[22] Filed: Sep. 6, 1996

[51] Int. Cl.⁶ .................................................. B65D 37/00
[52] U.S. Cl. .................................. 222/212; 222/568
[58] Field of Search .......................... 222/92, 212, 568; 99/345, 532

[56] References Cited

U.S. PATENT DOCUMENTS

| | | | |
|---|---|---|---|
| D. 288,006 | 1/1987 | Bergström et al. | D24/63 |
| 3,337,039 | 8/1967 | Knittel et al. | 206/47 |
| 3,390,821 | 7/1968 | Mullan | 222/212 |
| 3,506,163 | 4/1970 | Rauh et al. | 222/212 |
| 4,258,714 | 3/1981 | Leopoldi et al. | 128/232 |
| 5,333,761 | 8/1994 | Davis et al. | 222/212 |

OTHER PUBLICATIONS

Four undated sheets showing known icing implements.

Primary Examiner—Andres Kashnikow
Assistant Examiner—Keats Quinalty
Attorney, Agent, or Firm—John A. Doninger

[57] ABSTRACT

An icing implement including a collapsible bulb-shaped container with an enlarged discharge mouth, a discharge nozzle and an adapter collar interposed between the enlarged container mouth and the relatively restricted internal passage of the nozzle to effectively seal to both and provide for movement of material from the container to the nozzle upon an axial compression of the bottom of the container upwardly and inwardly into the interior of the container. The collapse of the container is effected in equal volume increments with the container retaining its collapsed position.

20 Claims, 3 Drawing Sheets

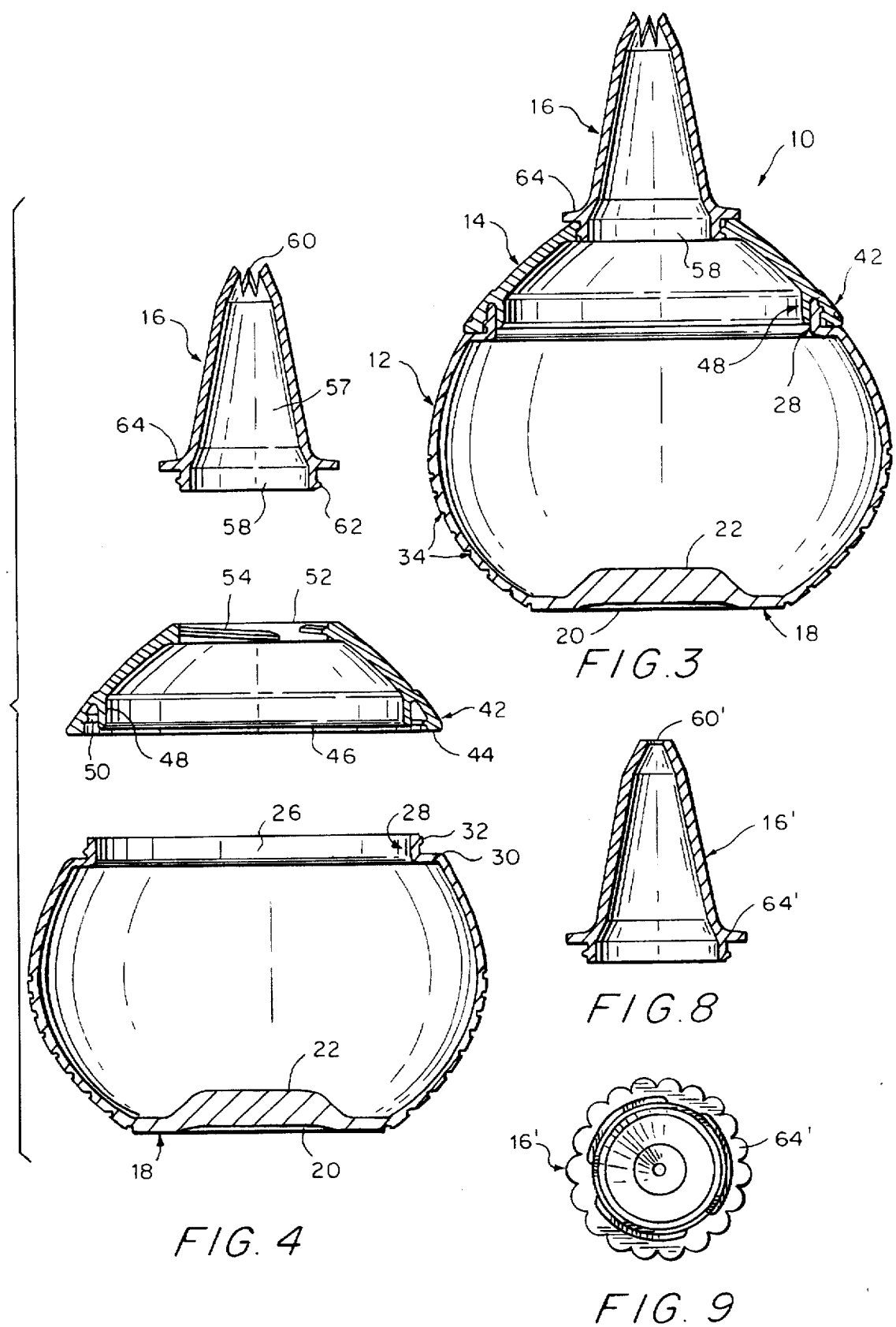

ICING SET

BACKGROUND OF THE INVENTION

Hand-held dispensers for viscous foodstuffs are well known, are of various configurations and are used for a variety of purposes. The present invention is particularly concerned with such dispensers which are intended for use in cake decoration and the like wherein the icing or other flowable materials are dispensed by hand manipulation of the implement.

Such implements, in substantially all instances, include a container for the material and a dispensing nozzle through which the material is discharged from the container, normally in a decorative pattern. Known implements of this type include, in a basic form, an open ended bag or parchment funnel forming a nozzle at one end or mounting an appropriate nozzle for discharge as the bag or parchment is compressed. More elaborate forms of icing implements include those with cylindrical container bodies accommodating a syringe-type plunger. Such cylindrical instruments can also be provided with transverse corrugations which allow for an axial compression of the container itself for a discharge of the contents.

Existing icing or cake decorating implements frequently are less than satisfactory for a variety of reasons. For example, many such implements cannot be conveniently manipulated and/or the amount of dispensing material cannot be exactly controlled. Another significant problem is the inconvenience of filling the implement with the viscous material, such normally being effected through the small diameter port within which the nozzle mounts. While syringe-type dispensers may include an opening for the introduction of material which is wider than the nozzle, the container body for such dispensers, to accommodate the actuating plunger, is normally restricted to being no greater than the diameter of the opening. The older types of implements, in many instances still used by professional chefs and the like, formed of pouches with a nozzle mounted at the inner end thereof, have wide filling mouths. However, such implements, with the normally open ended container, require the use of two hands and a great deal of control.

SUMMARY OF THE INVENTION

The cake decorating device of the invention is a particularly practical implement which combines, in a unique structure, all of the features most desired.

For example, the device or implement can be easily held and manipulated by one hand, the container is easily filled through a large selectively open mouth, the container sits on a table or countertop in an upright stable position both when completely filled and when partially emptied and collapsed, and interchangeable nozzles easily mount and are accommodated to the large mouth of the container by an adapter collar which effectively seals to the container and the substantially smaller nozzle while providing an effective guiding for the forceably discharging material. In addition to the above, the device, and particularly the container thereof, is easily cleaned for reuse and, through the provision of a friction-fitted cap on the nozzle, can be easily sealed with the contents preserved.

In achieving the above objects, the container of the icing set is a bulb or of a bulbous configuration which is upwardly collapsible from the flat bottom, normally by thumb pressure, upwardly inverting into the interior of the bulb and toward an upper enlarged mouth thereof. This upward and inward collapsing is effected in distinctly indicated equal increments defined by a series of circumferential grooves, the spacing of which becomes less as the diameter of the bulb increases toward the approximate midsection or mid-height of the bulb. It is significant that the bulb retain its partially collapsed condition, this being effected by the particular nature of the material used, preferably a low low density polyethylene (LLDPE). The bulb, even when partially collapsed, provides a planar periphery about the lower end thereof and a resultant stable base.

The mouth of the bulb is substantially wider or of a greater diameter than the bottom of the bulb and at least greater than one-half the maximum diameter of the bulb, preferably on the order of two thirds or three quarters of this diameter. This greatly facilitates the introduction of the viscous material which can be either poured directly therein or easily introduced by a spoon-like tool. The interchangeable nozzles to be used are of basically the same dimensions as conventional icing nozzles, and as such have, in addition to a tapering longitudinal passage, an inlet end and a relatively smaller discharge end, both of which are substantially smaller than the enlarged mouth of the container bulb. In order to accommodate the nozzle to the container, an adapter ring or collar is removable mounted therebetween. This collar has an enlarged lower end or base defined by a peripheral edge portion which screw mounts to an upstanding neck surrounding the bulb mouth, and an upper peripheral edge portion defining a top opening corresponding to that of the inlet end of the nozzles and adapted to mount the nozzles, preferably by screw threads or interrupted screw threads. The collar tapers from the larger lower periphery to the substantially smaller upper periphery along a peripheral curvature which broadly corresponds to the curvature of the container. The collar, of greater rigidity than the container, forms a firm bearing surface against which a finger, or preferably two fingers, can engage as the thumb presses upward on the container bottom to effect the material discharge.

Other features and details of the invention will become apparent from the more specific description of the invention following hereinafter.

BRIEF DESCRIPTION OF THE DRAWINGS

FIG. 3 is a vertical cross-sectional view through the icing set;

FIG. 4 illustrates, in cross-section, the icing set with the components exploded to present the details of the interlocking means in particular;

FIG. 8 is a vertical cross-sectional view through the nozzle of FIG. 7; and

FIG. 9 is a bottom plan view of the nozzle of FIG. 7.

DESCRIPTION OF PREFERRED EMBODIMENTS

Figure 1:
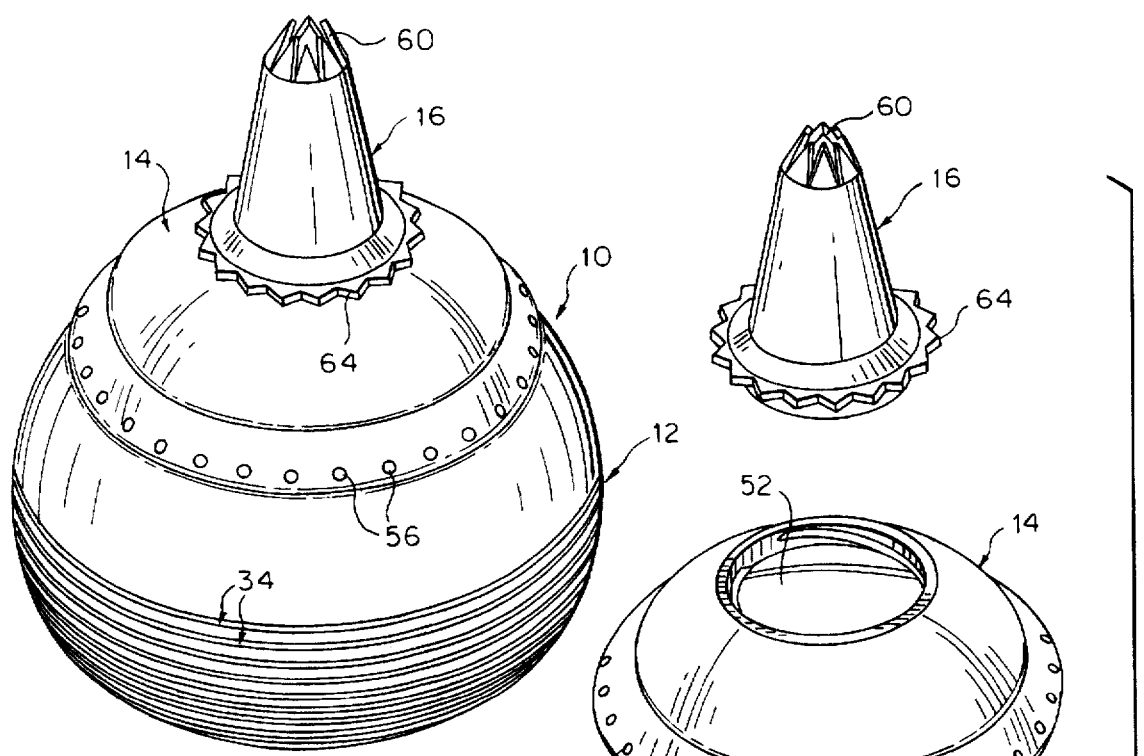
FIG. 1 is a perspective view of the icing set of the invention.
Figure 2:
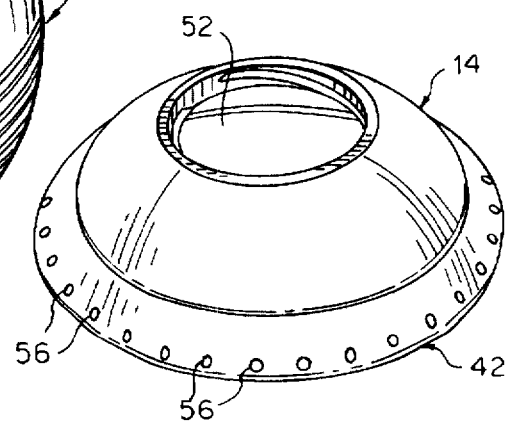
FIG. 2 is an exploded perspective view of the three components of the icing set.

Referring now more specifically to the drawings, the icing set 10 includes a container 12, an adapter collar 14 and a nozzle 16, all of appropriate food compatible materials. As shall be described presently, the collar 14 releasably mounts to the container 12 and in turn releasably mounts the nozzle 16 to provide a combined storage and dispensing device or implement for viscous materials such as cake icing.

The container 12 is in the shape of and is formed by a substantially spherical bulb having truncated top and bottom ends. The bottom 18 of the bulb or bulb container 12 forms a flat or planar support surface with a central outwardly facing recess 20, accommodating any minor surface irregularities in the table or countertop without affecting the stability provided by the flat surface of the bottom 18. The central recess 20 will also provide a finger guiding pressure area for the application of upward content-discharging pressure on the bottom 18 for an upward displacement of the bottom 18 into the interior of the bulb 12 as suggested in FIG. 6. In addition, the bottom 18, within the interior of the bulb 12, is upwardly or inwardly enlarged and thickened at the central portion thereof corresponding with the underlying recess 20. This enlargement 22 tends to strengthen and rigidify the bottom 18 and, through the sloping periphery thereof, cause a uniform movement through the viscous material to allow for a uniform upward movement of the bottom and a controlled displacement of the contents toward the mouth of the container while maintaining a planar support bottom surface, also as suggested in FIG. 6. The remainder of the interior of the bulb 12 is smooth and uninterrupted to allow for a free flow of the material therefrom, as well as facilitating a cleaning of the interior bulb.

The truncated top of the bulb 12 includes an enlarged upwardly opening mouth 26 which is of a diameter substantially greater than the diameter of the flat bottom 18 and greater than one-half the maximum diameter of the bulb 12 at approximately mid-height of the generally spherical configuration thereof. The open mouth 26 is defined by an annular upstanding neck flange 28 integral with the inner edge of a narrow surrounding horizontal shoulder 30 extending radially inward from the side wall of the bulb 12. The mouth-defining flange 28 has screw thread components or the like 32 integrally formed with the outer surface thereof for engagement of the collar 14 therewith.

The discharge of the contents, as previously noted, is to be effected by an axial upward and inward collapsing of the bottom into the container. It is also significant that the container retain its collapsed position and not spring back or return to its original position upon release of finger pressure thereon. Low low density polyethylene (LLDPE) has been found to be particularly appropriate for this use in that, in addition to the ability to allow collapse without "spring back", this synthetic resin also is of an inherent rigidity sufficient to have the screw threads defined therefrom.

Figure 5:
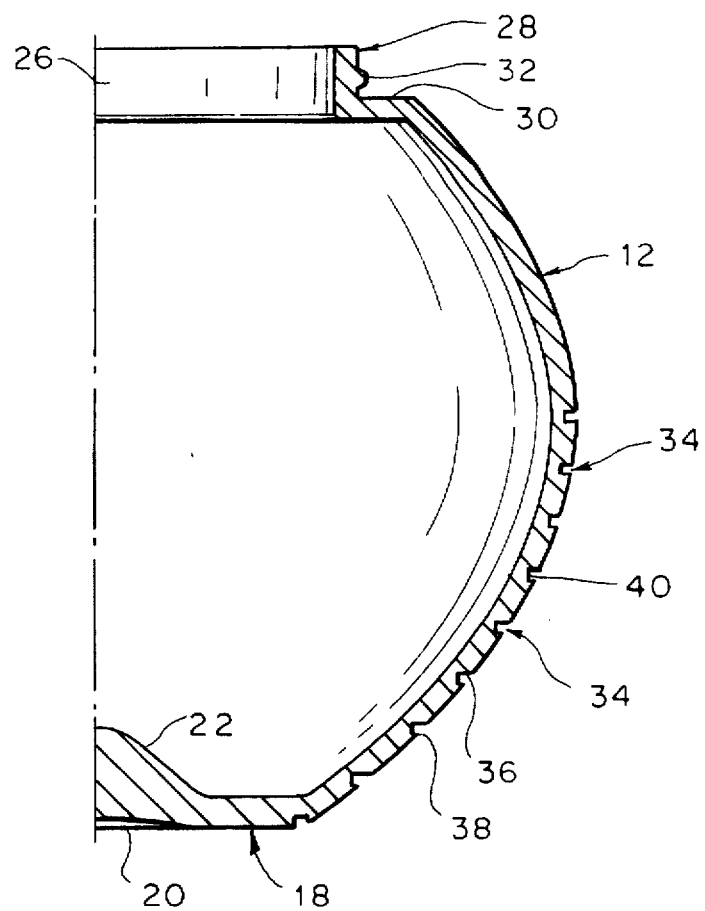
FIG. 5 is an enlarged partial cross-sectional view illustrating details of the fully expanded bulb container.
Figure 6:
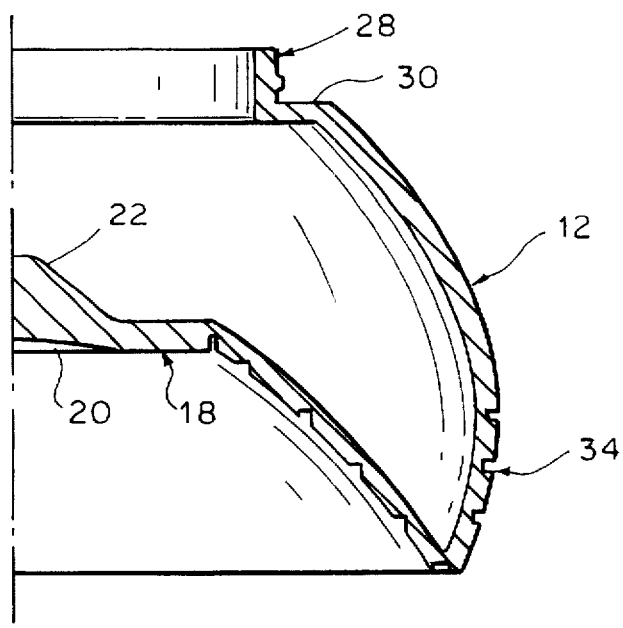
FIG. 6 is a cross-sectional detail similar to FIG. 5 with the bulb partially collapsed.

Noting the details of FIGS. 5 and 6, the container 12, upwardly to approximately mid height and the maximum diameter of the container, is provided with peripheral grooves 34 in the exterior surface thereof. The spacing of such grooves, which parallel each other, regularly decreases upward from the bottom 18, the grooves 34 toward the bottom 18 of the container being more widely spaced than the grooves toward the central area of the container. The grooves 34, so formed, encourage a level, axial collapsing of the container, facilitate the collapsing movement and provide incremental steps, distinctly noted visually and by feel during the manual collapse of the bulb, signifying the dispensing of a predetermined amount of material. The variation in the spacing of the grooves 34 is directly correlated to the increase in the diameter of the interior of the container. In other words, as the diameter of the container, and hence the volume of material between adjacent grooves, increases upwardly from the bottom, the groove spacing becomes less. This correlation is provided to ensure that an equal amount of material is dispensed at each incremental step between adjacent grooves 34. As will be noted from FIG. 5 in particular, all of the grooves are formed with horizontal upper and lower faces 36 and 38, that are parallel to the flat bottom surface, and with the inner wall 40 of each groove perpendicular or vertical relative thereto.

The adapter collar 14, of an appropriate synthetic resin such as polypropylene (PP), is of greater rigidity than the bulb container 12 and of a general dome configuration broadly following the spherical configuration of the bulb container 12. The collar 14 has a bottom or lower peripheral edge portion 42 forming an annular base 44 which defines a base opening 46 of generally the same diameter, or size and configuration, of said container mouth 26. The base portion 42 includes an annular depending integral flange 48 which, upon a mounting of the collar 14 on the container 12, frictional although slidably engages with the inner surface of the flange 28 defining the container mouth. The lower portion 42 of the collar 14, immediately outward of the flange 48, includes interior threads or thread components 50 which correspond to and threadedly engage the collar 14 onto the container threads 32. The collar 14 is rotated into engagement with the container neck flange 28 which brings the neck flange 28 into seated engagement with the cap peripherally about the cap flange 48, providing for a positive seal against leakage. The screw threads are preferably interrupted threads to expedite engagement between the collar and bulb neck.

The collar 14, at the top thereof, includes a top opening 52 defined by a peripheral edge portion having integral inwardly directed thread or screw components 54 thereon. This top opening 52 has a diameter substantially less than the diameter of the base opening 46 of the collar 14 and is specifically configured to engage the nozzle 16 as shall be explained presently.

The internal surface of the collar 14, immediately above the inner flange 48, is smoothly arced toward the reduced top opening on the upper collar mouth 52 for unencumbered flow of material. For additional strength at the point of joinder between the collar and the container, the lower peripheral edge portion 42 can be slightly thickened, as illustrated. In addition, the collar 14 will preferably include a series of external recesses or projections 56 peripherally thereabout to allow for a convenient gripping and manipulation of the otherwise smooth collar 14.

The nozzle 16 is vertically elongate and includes an interior passage 57 upwardly tapering from a lower mounting end 58 to an upper discharge end 60. The discharge end 60 will normally be configured to define a particular pattern or configuration in the discharging viscous material. For example, the nozzle 16, as illustrated, will produce a longitudinal ribbed or grooved ribbon of material.

The nozzle 16, for a minor portion of the height thereof at the mounting end 58, is of cylindrical configuration and includes an external threaded screw or thread elements 62 which threadedly engage with the screw elements 54 within the peripheral edge portion defining the upper collar mouth 52. It is preferred that the threads 54 and 62 be interrupted threads to minimize alignment problems and expedite mounting. Immediately above the cylindrical lower portion of the nozzle, the nozzle includes an outwardly extending peripheral flange 64, preferably formed with a flange edge of alternating projections and recesses to facilitate the gripping and rotational mounting and removal of the nozzle 16 from the collar 14. The nozzle 16, above the annular flange 64, will have a substantially conical configuration conforming to the tapered internal passage 57. In mounting the nozzle, the flange 64 will be brought into bearing engagement with the top of the collar 14 about the periphery of the top opening 52 to define an effective seal therewith. Also, noting FIG. 3 in particular, it will be appreciated that the cylindrical portion which defines the inlet opening at the lower mounting end 58 of the nozzle is of a height substantially corresponding to the thickness of the wall of the collar about the opening 52 therein to provide for a smooth transition to the interior to the nozzle 16.

Figure 7:
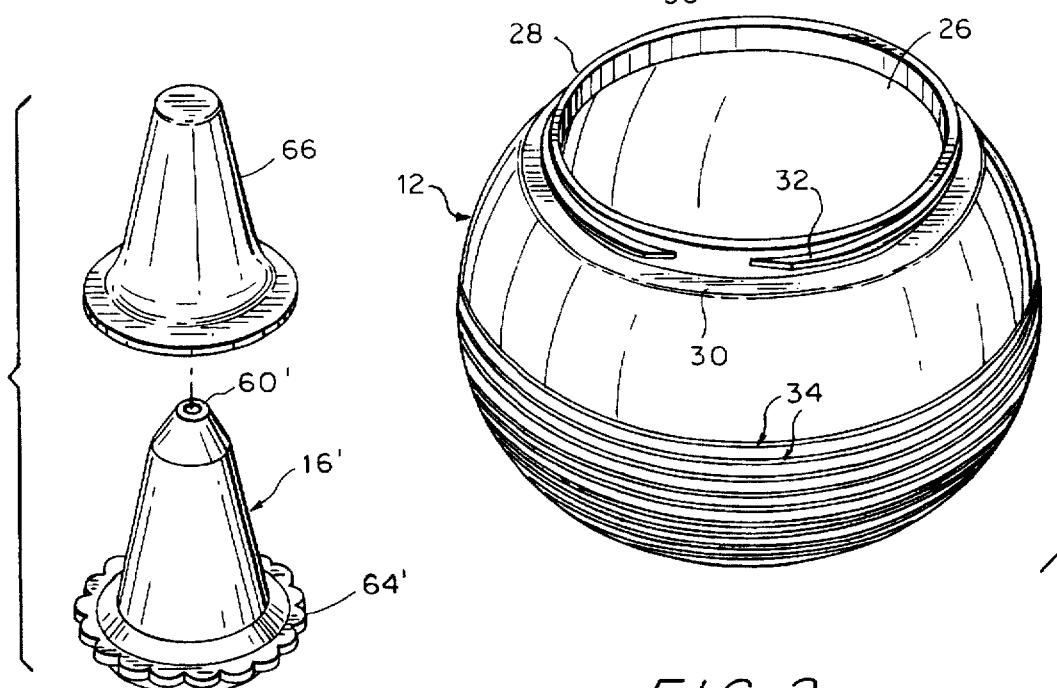
FIG. 7 (sheet 1) is a perspective detail of a modified form of nozzle with a sealing cap exploded therefrom.

Noting FIGS. 7, 8 and 9, a modified form of nozzle 16' is illustrated therein, this nozzle 16' being interchangeable with the nozzle 16 and differing therefrom only in the specific configuration of the discharge end 60', which will provide for a smooth cylindrical discharge, and the peripheral edge of the mounting flange 64'. It is contemplated that the icing set be provided with several interchangeable nozzles of different decorative discharge capabilities.

In use, the icing implement is capable of one-handed manipulation, normally with the thumb engaged within the bottom recess 20 of the container and two fingers of the hand engaged over the collar 14, one to each side of the nozzle 16. The material of the collar 14, for example polypropylene, is more rigid than the material of the container or bulb 12. As such upward pressure on the thumb produces an effective axial upward compression of the bulb, from the bottom thereof, toward the overlying relatively incompressible collar wherein an effective discharge of material is achieved in a controlled incremental matter.

The ability of the container to retain its collapsed position or partially collapsed position is significant in avoiding any inward withdrawal of viscous material and a portion of the ambient atmosphere which might tend to corrupt the material in the container. Thus, the icing set is in effect self sealing for temporary storage purposes. In addition, and as noted in FIG. 7, a sealing cap 66 can be provided for frictional engagement over the nozzle to provide further protection, particularly at the discharge end of the nozzle.

The unique provision of the wide mouth at the top or discharge end of the container is significant in allowing for the rapid loading of the container, by either pouring the material directly therein from a mixing bowl or the like or rapidly spooning the material into the container. Further, the enlarged mouth allows for ready access into the interior of the container for cleaning purposes and to return the cleaned bulb to its original expanded condition. The bulb configuration of the container provides for a substantially enlarged internal capacity, not limited to the size of the mouth. In other words, the container while including a large mouth, can in fact have a greater capacity than that merely defined by the area of the mouth. Further, notwithstanding the enlarged mouth, the unique adapter collar allows for the use of substantially conventionally dimensioned nozzles wherein the discharge normally desired from such cake decorating implements is retained.

The foregoing is considered illustrative of the principles of invention which are intended to encompass other embodiments within the scope of the claims following hereinafter.

I claim:

1. A dispenser for viscous foodstuff comprising a container of generally spherical configuration, said container having a truncated bottom forming a flat support surface of a predetermined diameter, and a truncated top defining an open container mouth of greater diameter than said bottom, said container, for the full height thereof between said bottom and said top, being of a greater diameter than the diameter of said bottom, said container being axially compressible with said bottom being axially moveable upward into said container and toward said open mouth to a collapsed position, a collar, means for releasably sealing said collar to said container about said container mouth, said collar tapering upward from and in overlying relation to said container mouth, said collar having a top opening of substantially lesser diameter than said container mouth, a nozzle, and means for releasably mounting said nozzle to said collar in overlying communication with said collar top opening.

2. The dispenser of claim 1 wherein said container, for a major portion of the height thereof above said bottom, being of a greater diameter than said container mouth.

3. The dispenser of claim 2 including means integral with said container for facilitating incremental dispensing of equal amounts of the contents of the container.

4. The dispenser of claim 3 wherein said means for facilitating incremental dispensing comprises circumferential grooves defined in said container in parallel spaced relation to each other for a predetermined height upward from said bottom, spacing between said grooves sequentially decreasing upward from said bottom with the spacing between adjacent grooves being determined by the progressively greater container volume upward from said base resulting from said generally spherical configuration of said container.

5. The dispenser of claim 4 wherein said nozzle includes a lower mounting end portion engagable with said collar, said means for mounting said nozzle to said collar comprising interlocking means on said nozzle lower end portion and said collar selectively engagable upon rotation of said nozzle and collar relative to each other, and means for facilitating rotation of said nozzle relative to said collar, said means for facilitating rotation including an integral flange formed peripherally about said lower end portion of said nozzle, said flange having gripping means defining an outer peripheral edge thereon.

6. The dispenser of claim 5 wherein said gripping means comprises alternating projections and recesses peripherally about said flange.

7. The dispenser of claim 4 wherein said container is formed of a synthetic resin selected to generally exhibit a capability of retention of said container in said collapsed position.

8. The dispenser of claim 7 wherein said collar is formed of a synthetic resin of greater rigidity than said container for facilitating upward collapsing of said container body thereagainst.

9. The dispenser of claim 5 wherein said means for sealing said collar to said container includes interlockable means on said container and said collar engagable upon relative rotation between said collar and said container, said collar having grip enhancing portions integral therewith and peripherally thereabout.

10. The dispenser of claim 9 wherein said means for sealing said collar to said container includes a flange integral with said collar and depending therefrom and in intimate engagement with said container peripherally about said container mouth.

11. The dispenser of claim 2 wherein said container bottom includes a central recess, said flat support surface being defined annularly about said central recess.

12. The dispenser of claim 11 wherein said container bottom has a central portion thereof, substantially coextensive with the bottom recess, upwardly enlarged within said container and defining a means for rigidifying the central portion of said bottom.

13. An icing set including a collapsible container, an adapter collar and a nozzle; said nozzle having a mounting end with an inlet opening of predetermined diameter, and a remote discharge opening, said container comprising a truncated, generally spherical bulb having a bottom and an upwardly directed mouth of substantially greater diameter than said nozzle inlet opening for the introduction of material for subsequent controlled discharge through said nozzle, said collar having a bottom peripheral edge portion forming a base with a base opening defined therein, said collar base opening being of generally the same diameter as the diameter of said upwardly directed mouth of said container, means for peripherally engaging said collar base to said container with said base sealed to said container and said base opening in communication with said upwardly directed mouth for the direct transfer of the material from said container to said collar, said collar having an upper peripheral edge portion forming an upper end with a top opening defined therein, said top opening having a diameter substantially less than the diameter of the base opening and generally equal to the diameter of the nozzle inlet opening, and means for engaging said nozzle mounting end to said collar with said nozzle inlet opening in direct communication with said collar top opening for the passage of material therebetween.

14. The icing set of claim 13 wherein said container has a maximum diameter intermediate said container bottom and said container mouth, said container bottom being upwardly moveable into the interior of said container with a portion of said container, upward from said bottom, inverting into said container.

15. The icing set of claim 14 wherein said container is formed of a synthetic resin material selected to retain said container bottom in an upwardly moved position within the interior of said container and resist retraction from said container.

16. The icing set of claim 15 including grooves defined in and peripherally about said container from said bottom to approximately mid height on said container, said grooves having predetermined spacings therebetween progressively decreasing upward from said bottom and defining incremental steps in the upward movement of said bottom into the interior of said container.

17. The icing set of claim 16 wherein the spherical configuration of said container, and the spacing between said grooves, are so related as to provide for a discharge of material which is equal at each incremental step of the container as the bottom is upwardly moved therein.

18. The icing set of claim 17 wherein said means for engaging said nozzle mounting end to said collar comprising quick-mounting complimentary interrupted threads on said nozzle and said collar.

19. The icing set of claim 18 wherein said collar defines a general spherical continuation of said container, said collar in said bottom peripheral edge portion, having integrally formed manual gripping means peripherally thereabout and providing surface disruptions therein.

20. The icing set of claim 19 wherein said means for peripherally engaging said collar base to said container comprises interlocking thread means on said collar base and said container selectively engageable and disengageable upon rotation of said collar relative to said container.

* * * * *